United States Patent Office 3,297,652
Patented Jan. 10, 1967

3,297,652
METHOD OF SUPPRESSING ELECTROSTATIC CHARGES IN SYNTHETIC RESINS AND FIBERS
Shinichi Tomiyama, 136 2-chome, Onigoe-machi, Ichikawa-shi, Chiba-ken, Japan; Hideo Marumo, 65—11 Nishikubo, Musashino-shi, Tokyo-to, Japan; and Makoto Takai, 3204—51 Asahigaoka-cho, Chiba-shi, Chiba-ken, Japan
No Drawing. Filed Dec. 2, 1963, Ser. No. 327,532
10 Claims. (Cl. 260—75)

This application is a continuation-in-part of copending application, Serial No. 174,296, filed February 19, 1962, now abandoned.

This invention relates to a method of suppressing electrostatic charges in synthetic resins and fibers. More specifically, this invention is directed to a method of suppressing electrostatic charges in synthetic resins and fibers normally tending to generate such charges, by incorporating metal salts of amphoteric surface active agents into the synthetic resins and fibers.

The problem of static electricity in synthetic resins and fibers is very serious and much effort has been devoted to eliminating or reducing the magnitude of accumulated electrostatic charges. The problem is manifested in contamination and dust accumulation on articles made from the synthetic resins and fibers and in annoying shocks and sometimes dangerous sparks from formed articles, textiles and films from the synthetic resins and fibers.

These difficulties arise not only in the service life of the formed synthetic resins and fibers compositions, such as sheets, filaments and cast and molded articles, but also during the manufacturing of such articles, which can result in a slowdown in production, waste and hazards of explosions.

Articles comprising synthetic resins and fibers tend to accumulate electrostatic charges during manufacture, treatment and use. These accumulated electrostatic charges are troublesome in that not only do they render the articles more difficult to handle during manufacture and treatment, but also in that they greatly increase the tendency of the finished articles to accumulate unwelcome dust in use.

Many methods have been proposed to prevent the accumulation of static charges, none of which are entirely satisfactroy. External methods such as temperature and humidity control, and dipping into aqueous surface active agent solutions have been employed in production operations, but antistatic protection thereby is temporary and exists only when the synthetic resins and fibers are exposed to such condition.

A great number of agents have also been proposed for treating the surface of synthetic resins and fibers to prevent the generation or accumulation of electrostatic charges. However, such treatments are generally temporary in nature since these agents are removed by washing, leaching or abrasion.

All surface treatment methods, however, require additional handling of the formed articles from the synthetic resins and fibers during such treatment. This is generally undesirable from a production handling viewpoint and undesirable to the ultimate user if repeated applications are necessary. While such a surface treatment is effective, static protection of the articles is removed with washing or contact with water because of the high water solubility of the surface active agents.

It is known that internal modification of synthetic resin and fiber compositions may be effective in reducing static accumulation. Such internal modification is generally superior to any surface treatment or coating because of the permanency achieved, and can be accomplished easily by adding to the synthetic resins and fibers an antistatic agent which is unreactive with and compatible to the synthetic resins and fibers, and is stable up to the high temperatures at which the synthetic resins and fibers are processed.

It is, therefore, one of the objects of the present invention to provide a method for suppressing electrostatic accumulation by an antistatic agent which can be incorporated into a resinous composition, thereby eliminating the necessity of repeated separate surface applications to obtain substantial antistatic protection over the service life of the article.

It is a further object of this invention to provide an antistatic agent, which, when incorporated into a resinous composition, will not sweat out or exude to the surface of the composition.

It is a still further object of this invention to provide an antistatic agent for reducing the static generating and accumulating tendency of a wide variety of resinous compositions which will not react with the resinous compositions or seriously alter or charge the phyical properties of the resin blends, when employed in amounts sufficient to give effective antistatic protection.

According to the present invention, it has been found that electrostatic generating tendencies of synthetic resins and fibers can be suppressed by incorporating metal salts of amphoteric surface active agents into the synthetic resins and fibers. These metal salts of amphoteric surface agents have been found to give antistatic protection which is substantially permanent for the service life of the articles made from synthetic resins and fibers. It has also been found that these products do not sweat out or exude to the surface of the articles made from synthetic resins and fibers, and are not easily leached out by exposure to water. These metals salts of amphoteric surface active agents may be prepared by various methods in which alkylamines or basic nitrogen compounds are converted into metal salts of amphoteric surface active agents by introduction of anion radicals and salt formation with metal radicals. These metal salts of amphoteric surface active agents are effective in suppressing the accumulation of electrostatic charges when employed in amounts of at least $\frac{1}{20}$ part by weight per hundred parts of the synthetic resins and fibers.

For the most applications, amounts of about one half to ten parts by weight per hundred parts of the synthetic resins and fibers are preferred, although a greater amount can be employed. The optimum concentration of antistatic agent is dependent upon such factors as the degree of static elimination desired and the kinds of synthetic resins and fibers to be treated. No undesirable changes in physical properties of the synthetic resins and fibers are noticed when the antistatic agents are employed within these preferred limits.

The antistatic agents of this invention can be incorporated into a wide variety of synthetic resins and fibers normally tending to accumulate electrostatic charges during their service life.

Such synthetic resins and fibers which are susceptible to accumulating static charges in which the antistatic agents are particularly useful include the hydrophobic polymers, copolymers and polycondensates such as polyethylene, polyvinyl chloride, polymethacrylates, polyamides, polyethylene glycol terephthalate, polypropylene and the like. Particularly good results are obtained on polyethylene and polypropylene.

The synthetic resins and fibers can, after the incorporation of the antistatic agents, be formed in any desired shape such as sheet, film, filament, or into cast or molded articles.

The synthetic resins and fibers into which these antistatic agents may be incorporated can also contain other materials such as dyes, pigments, fillers, plasticizers, lubricants, and the like without adversely affecting the effectiveness of these antistatic agents. These products can be incorporated into the synthetic resins and fiber blends before the forming operation.

These metal salts of amphoteric surface active agents have following chemical formulas:

(I) 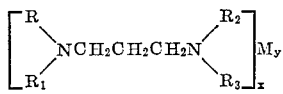

wherein R represents an alkyl radical containing 8 to 22 carbon atoms; $R_1$, $R_2$ and $R_3$ are each selected from the group consisting of H and $CH_2CH_2COO$, at least one of $R_1$, $R_2$ and $R_3$ being $CH_2CH_2COO$; M represents a metal selected from the group consisting of Mg, Ca, Cd, Sn, Ba, Pb, Al, Fe, Co, Ni, Zn, Cu, Mn; and $x$ and $y$ are integers to be determined by the valence and number of metal atoms, there being H atoms attached to any COO groups in $R_1$, $R_2$ and $R_3$ which are not bonded to M, (II) 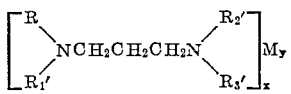

wherein R represents an alkyl radical containing 8 to 22 carbon atoms; $R_1'$, $R_2'$ and $R_3'$ are each selected from the group consisting of H, $CH_2CH_2COO$ and

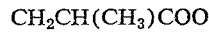

at least one of $R_1'$, $R_2'$ and $R_3'$ being $CH_2CH(CH_3)COO$; M represents a metal selected from the group consisting of Mg, Ca, Cd, Sn, Ba, Pb, Al, Fe, Co, Ni, Zn, Cu, Mn; and $x$ and $y$ are integers to be determined by the valence and number of metal atoms there being H atoms attached to any COO groups in $R_1'$, $R_2'$ and $R_3'$ which are not bonded to M.

The metal salts described above may be prepared by a method in which higher alkylamines and alkyldiamines are reacted with acrylonitrile or acrylic methyl ester, and their reaction products are hydrolyzed to sodium salts of higher alkylaminopropionic acids, alkyliminodipropionic acids or alkyl diamine derived propionic acids, and then, by double decomposition, metal salts of their propionic acids are formed.

EXAMPLE 1

100 parts of low density polyethylene and 1 part of a metal salt of amphoteric surface activator having the chemical formula of $$(C_{12}H_{25}NHCH_2CH_2CH_2NHCH_2CH_2COO)_2M$$

were placed in a Banbury mixer and blended in a normal way. The pellet of the above mixture was fed to an extrusion machine and was extruded in a sheet form of 1 mm. thick at a die temperature of 200° C. After aging the sheet at a constant temperature of 20° C. and a relative humidity of 65 percent, the electric resistance of the sheet was measured at the same conditions. Also, the sheet was rubbed with clean nylon taffeta and the static electricity generated was measured by a variable capacitance electrostatic voltmeter. In comparison with Blank test, the static charge and the electric resistance were remarkably lowered to indicate satisfactory antistatic protection. The results are shown in the following Tables 1 and 2.

Table 1

| Antistatic Agent No. | M | Surface Resistivity (Ω) | Volume Resistivity (Ω-cm.) | Static Generation (volts) | |
|---|---|---|---|---|---|
| | | | | Rubbed 300 times | Rubbed 900 times |
| 1 | Mg | $1.7 \times 10^9$ | $4.5 \times 10^{12}$ | 30 | 100 |
| 2 | Ca | $3.7 \times 10^{10}$ | $6.7 \times 10^{14}$ | 10 | 80 |
| 3 | Pb | $4.3 \times 10^9$ | $1.3 \times 10^{15}$ | 70 | 180 |
| Blank test | | $1.4 \times 10^{16}$ | $1.6 \times 10^{17}$ | 3,500 | 4,500 |

Table 2

$(C_{12}H_{25}NHCH_2CH_2CH_2NHCH_2CH_2COO)_3Al_2$

| Antistatic Agent No. | Surface Resistivity (Ω) | Volume Resistivity (Ω-cm.) | Static generation (volts) | |
|---|---|---|---|---|
| | | | Rubbed 300 times | Rubbed 900 times |
| 4 | $7.8 \times 10^9$ | $1.3 \times 10^{15}$ | 90 | 220 |
| Blank test | $1.4 \times 10^{16}$ | $1.6 \times 10^{17}$ | 3,500 | 4,500 |

EXAMPLE 2

The procedure of Example 1 was repeated with the exception that 1 part of a metal salt of amphoteric surface activator having the chemical formula of

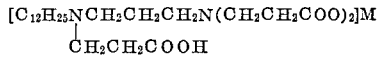

was incorporated into 100 parts of low density polyethylene. The results are shown in the following Tables 3 and 4.

Table 3

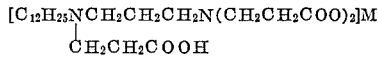

| Antistatic Agent No. | M | Surface Resistivity (Ω) | Volume Resistivity (Ω-cm.) |
|---|---|---|---|
| 5 | Mg | $4.7 \times 10^9$ | $4.8 \times 10^{14}$ |
| 6 | Ca | $8.7 \times 10^{10}$ | $1.2 \times 10^{15}$ |
| 7 | Cd | $5.9 \times 10^9$ | $8.3 \times 10^{14}$ |
| 8 | Pb | $2.4 \times 10^9$ | $9.7 \times 10^{14}$ |
| 9 | Sn | $3.4 \times 10^{10}$ | $4.7 \times 10^{13}$ |
| 10 | Ba | $5.2 \times 10^{10}$ | $6.2 \times 10^{14}$ |
| 11 | Fe | $4.4 \times 10^{10}$ | $3.8 \times 10^{14}$ |
| 12 | Co | $8.1 \times 10^9$ | $4.9 \times 10^{14}$ |
| 13 | Ni | $9.8 \times 10^9$ | $7.2 \times 10^{14}$ |
| 14 | Zn | $7.6 \times 10^9$ | $3.2 \times 10^{14}$ |
| 15 | Cu | $3.1 \times 10^9$ | $6.6 \times 10^{15}$ |
| 16 | Mn | $3.2 \times 10^{10}$ | $2.6 \times 10^{14}$ |
| Blank test | | $1.4 \times 10^{16}$ | $1.6 \times 10^{17}$ |

Table 4

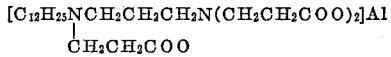

| Antistatic Agent No. | Surface Resistivity (Ω) | Volume Resistivity (Ω-cm.) |
|---|---|---|
| 17 | $2.2 \times 10^{12}$ | $4.6 \times 10^{14}$ |
| Blank test | $1.4 \times 10^{16}$ | $1.6 \times 10^{14}$ |

EXAMPLE 3

1 part of antistatic agent No. 2 was mixed with 100 parts of polypropylene pellets same as Example 1 and then the mixture was extruded in a sheet form of 1 mm. thick at a die temperature of 220° C. Thereafter, the electric resistance and the electrostatic voltage of the sheet were measured by the same method as that of Example 1. The results are shown in the following Table 5.

Table 5

| Antistatic Agent No. | Surface Resistivity (Ω) | Volume Resistivity (Ω-cm.) | Static generation (volts) | |
|---|---|---|---|---|
| | | | Rubbed 300 times | Rubbed 900 times |
| 2 | $1.3 \times 10^{10}$ | $1.7 \times 10^{12}$ | 0 | 50 |
| Blank test | $1.3 \times 10^{15}$ | $1.4 \times 10^{16}$ | 2,000 | 3,600 |

EXAMPLE 4

100 parts of nylon chip and 2 parts of antistatic agent No. 2 were mixed like Example 1. This mixture was melted and spun by a spinning machine at a nozzle temperature of 260° C. and then stretched four times by length. The filament of 300 denier thus obtained was aged at a constant temperature of 20° C. and at a relative humidity of 65%, after which the electric resistance of the filament was measured at the same conditions of temperature and humidity. The results are shown in the following Table 6.

*Table 6*

Antistatic agent No.:                                  Resistivity ($\Omega$)
2 _____ $4.6 \times 10^9$
Blank test _____ $3.8 \times 10^{15}$

EXAMPLE 5

The procedure of Example 4 was repeated with the exception that 2 parts of antistatic agent No. 2 were incorporated into 100 parts of polyethylene-glycol terephthalate at a nozzle temperature of 270° C. The results are shown in Table 7 below.

*Table 7*

Antistatic agent No.:                                      Resistivity ($\Omega$)
2 _____ $3.2 \times 10^9$
Blank test _____ $4.5 \times 10^{16}$

EXAMPLE 6

1 part of dibutyl tin maleate as a stabilizer was incorporated by means of a roll mill at a temperature of 120° C. into 100 parts of copolymer composed of 85% vinyl chloride and 15% vinyl acetate, from which two pieces of test sample were prepared. The one was used for Blank test and the other was further mixed with 1 part of antistatic agent No. 2 when it was being incorporated in the roll mill. The respective test sample was extruded same as Example 1 and was tested. The results are shown in Table 8 below.

*Table 8*

| Antistatic Agent No. | Static generation | |
|---|---|---|
| | Rubbed 300 times | Rubbed 900 times |
| 2 | 210 | 390 |
| Blank test | 1,700 | 3,200 |

EXAMPLE 7

The procedure of Example 1 was repeated with the exception that 1 part of different antistatic agents Nos. 1 and 2 was incorporated into 100 parts of polystyrene. The results are presented in the following Table 9.

*Table 9*

| Antistatic Agent No. | Surface Resistivity ($\Omega$) | Volume Resistivity ($\Omega$-cm.) |
|---|---|---|
| 1 | $4.7 \times 10^{10}$ | $2.6 \times 10^{15}$ |
| 2 | $7.8 \times 10^9$ | $3.7 \times 10^{15}$ |
| Blank test | $1.5 \times 10^{17}$ | $2.3 \times 10^{17}$ |

EXAMPLE 8

1 part of a metal salt of amphoteric surface activator synthesized from stearyl trimethylene diamine and methacrylic acid was incorporated into 100 parts of high density polyethylene pellets and the mixture was extruded in a sheet form of 1 mm. thick. Thereafter, the electric resistance of the sheet was measured like Example 1. The results are shown in Table 10 below.

*Table 10*

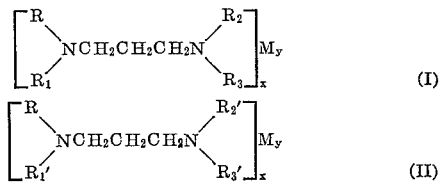

| Antistatic Agent No. | M | Surface Resistivity ($\Omega$) | Volume Resistivity ($\Omega$-cm.) |
|---|---|---|---|
| 18 | Mg | $2.8 \times 10^{10}$ | $1.8 \times 10^{15}$ |
| 19 | Ca | $8.4 \times 10^{10}$ | $3.6 \times 10^{15}$ |
| 20 | Ba | $7.1 \times 10^{10}$ | $2.1 \times 10^{15}$ |
| 21 | Zn | $1.5 \times 10^{11}$ | $6.1 \times 10^{15}$ |
| Blank test | | $8.1 \times 10^{16}$ | $2.8 \times 10^{17}$ |

What is claimed is:

1. A synthetic resin composition wherein electrostatic charges are suppressed comprising in addition to the synthetic resin, between 0.05 and 5% by weight of a substance represented by one of the two following Formulas I and II:

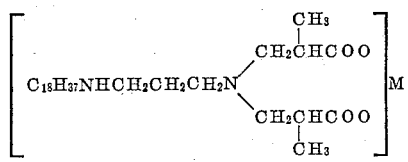

wherein R represents an alkyl radical containing 8 to 22 carbon atoms; $R_1$, $R_2$ and $R_3$ are each selected from the group consisting of H and $CH_2CH_2COO$, at least one of $R_1$, $R_2$, and $R_3$ being $CH_2CH_2COO$; $R_1'$, $R_2'$, and $R_3'$ are each selected from the group consisting of H, $$CH_2CH_2COO$$

and $CH_2CH(CH_3)COO$, at least one of $R_1'$, $R_2'$ and $R_3'$ being $CH_2CH(CH_3)COO$; and M represents a metal selected from the group consisting of Mg, Ca, Cd, Sn, Ba, Pb, Al, Fe, Co, Ni, Zn, Cu and Mn; and $x$ and $y$ are integers determined by the valence and number of metal atoms, there being hydrogen atoms attached to any COO group not connected to an M atom, said resin being selected from the group consisting of polyethylene, polyvinyl chloride, polymethacrylates, polyamides, polyethylene glycol terephthalate, polypropylene, polystyrene and copolymers of vinyl chloride and vinyl acetate.

2. A composition for suppressing electrostatic charges in synthetic resins and or fibers, as claimed in claim 1, in which at least one of $R_1$, $R_2$, and $R_3$ is $-CH_2CH_2COO$.

3. A composition for suppressing electrostatic charges in synthetic resins and or fibers, as claimed in claim 1, in which at least one of $R_1'$, $R_2'$ and $R_3'$ is

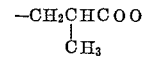

4. A composition as described in claim 1 in which the synthetic resin is low density polyethylene.

5. A composition as described in claim 1 in which the synthetic resin is polypropylene.

6. A composition as described in claim 1 in which the synthetic fiber is polyamide.

7. A composition as described in claim 1 in which the synthetic fiber is polyethylene-glycol terephthalic acid ester.

8. A composition as described in claim 1 in which the synthetic resin is a copolymer of vinyl chloride and vinyl acetate.

9. A composition as described in claim 1 in which the synthetic resin is polystyrene.

10. A composition as described in claim 1 in which the synthetic resin is high density polyethylene.

References Cited by the Examiner
UNITED STATES PATENTS

| | | |
|---|---|---|
| 2,922,771 | 1/1960 | Coler. |
| 3,005,793 | 10/1961 | Wagner. |
| 3,078,289 | 2/1961 | Rowland et al. ____ 260—429.7 |
| 3,190,763 | 6/1965 | Schleede et al. _____ 260—785 |

WILLIAM H. SHORT, *Primary Examiner.*

SAMUEL H. BLECH, R. T. LYON, *Assistant Examiners.*